(12) United States Patent
Lundy

(10) Patent No.: US 10,035,493 B1
(45) Date of Patent: Jul. 31, 2018

(54) HAND BRAKE LOCKING SYSTEM

(71) Applicant: Bryan K. Lundy, Republic, MO (US)

(72) Inventor: Bryan K. Lundy, Republic, MO (US)

( * ) Notice: Subject to any disclaimer, the term of this patent is extended or adjusted under 35 U.S.C. 154(b) by 113 days.

(21) Appl. No.: 15/190,968

(22) Filed: Jun. 23, 2016

Related U.S. Application Data

(60) Provisional application No. 62/184,360, filed on Jun. 25, 2015.

(51) Int. Cl.
| | | |
|---|---|---|
| *B60R 25/08* | (2006.01) | |
| *B60R 25/09* | (2013.01) | |
| *B60R 25/00* | (2013.01) | |
| *B61H 13/34* | (2006.01) | |
| *B60R 25/06* | (2006.01) | |
| *B61H 13/02* | (2006.01) | |

(52) U.S. Cl.
CPC .......... *B60R 25/008* (2013.01); *B60R 25/066* (2013.01); *B60R 25/086* (2013.01); *B61H 13/34* (2013.01); *B61H 13/02* (2013.01)

(58) Field of Classification Search
CPC ..... B60R 25/00; B60R 25/001; B60R 25/002; B60R 25/003; B60R 25/007; B60R 25/008; B60R 25/02; B60R 25/08; B60R 25/086; B60R 25/06; B60R 25/066
See application file for complete search history.

(56) References Cited

U.S. PATENT DOCUMENTS

| | | | | |
|---|---|---|---|---|
| 1,140,383 A | * | 5/1915 | Leeker ................ | B60R 25/005 188/265 |
| 1,288,569 A | * | 12/1918 | Hallock .............. | B60R 25/005 70/200 |
| 3,040,597 A | | 6/1962 | Bretz, Jr. | |
| 3,923,287 A | | 12/1975 | Wajih et al. | |
| 3,998,430 A | | 12/1976 | Weseloh | |
| 4,291,793 A | | 9/1981 | Klasing | |
| 4,825,671 A | * | 5/1989 | Wu ..................... | B60R 25/0221 70/202 |
| 4,972,693 A | * | 11/1990 | Inouye ................ | B60R 25/008 70/238 |
| 5,141,119 A | * | 8/1992 | Milazzo .............. | B60R 25/007 212/290 |
| 5,325,688 A | * | 7/1994 | Jaw-Jia .............. | B60R 25/008 70/200 |
| 6,003,350 A | * | 12/1999 | Sentner, Jr. .......... | B60R 25/066 70/202 |
| 6,325,465 B1 | | 12/2001 | Sommerfeld et al. | |
| 6,539,757 B2 | * | 4/2003 | Witchey ................ | B60R 25/00 70/202 |
| 8,123,004 B2 | | 2/2012 | Klasing et al. | |
| 9,346,435 B2 | * | 5/2016 | Cain ..................... | B60R 25/007 |
| 9,475,460 B2 | * | 10/2016 | Kantajaraniti ........ | B60R 25/066 |
| 2007/0056814 A1 | | 3/2007 | Michel et al. | |
| 2007/0151812 A1 | | 7/2007 | Michel et al. | |
| 2009/0293559 A1 | * | 12/2009 | Jeng ..................... | B60R 25/0221 70/209 |

\* cited by examiner

*Primary Examiner* — Christopher J Boswell
(74) *Attorney, Agent, or Firm* — Cramer Patent & Design, PLLC; Aaron R. Cramer

(57) ABSTRACT

A rail car hand brake locking system utilizes a connection member and a securing body. The connection member has an aperture near each distal end. The securing body has a head end capable of securing around a portion of an actuating wheel of the hand brake and a connection end capable of securing to the connection member, which is then affixed to the hand brake housing. The system prevents unauthorized usage of the hand brake.

14 Claims, 5 Drawing Sheets

HAND BRAKE LOCKING SYSTEM

RELATED APPLICATIONS

The present invention is a continuation-in-part of, was first described in, and claims the benefit of U.S. Provisional Application No. 62/184,360 filed Jun. 25, 2015, the entire disclosures of which are incorporated herein by reference.

FIELD OF THE INVENTION

The present invention relates generally to the field of brake locking devices and more specifically relates to a rail car hand brake lock for means of providing improved railroad equipment security.

BACKGROUND OF THE INVENTION

Railroad trains throughout the United States have provided a crucial interconnected highway between many cities and states. The safe passage of freight cars and train engines alike are a high priority for local businesses, state agencies, and federal agencies. As such, all railroad freight cars are required to have one or more hand brakes attached to them on at least one (1) end of the freight car.

There are countless trains that crisscross our country every day. These large vehicles bring just about every object we touch in our daily lives to us. While in motion, braking on the trains is performed by a pneumatic braking system. When rail cars are detached and separated, braking is performed by a manual hand wheel typically located at the end of each car. Theses brakes are used to secure the rail cars against unintended motion, movement, and even theft. However, anyone with even a basic knowledge of such braking systems can easily disengage such brakes accidentally or even maliciously. Chains are sometimes used as a means to secure such hand wheels, but they suffer from slack and/or the ability to turn the wheel in one (1) direction.

Hand brakes are most often set and released manually by a railroad worker, or as seen more recently such hand brakes may be remotely attended to. The current protocol is that a railroad worker must examine each hand brake before attempting to begin moving. Unfortunately, rail car hand brakes are not tamper proof and may not be effectively monitored at night or when the staff is not currently working.

A person who gains access to a rail car may also gain access to the rail car's hand brake. This would allow a scofflaw to tamper with the hand brake and potentially take control or sabotage operations of a train. If a freight car's brake is disengaged it is possible that it may roll off or even become a runaway car. Thus, a device that prevents manipulation of a rail car hand brake by non-railroad personnel is needed.

Various attempts have been made to solve problems found in hand brake locking devices. Among these are found in: U.S. Pat. No. 4,368,648 to Richard J. Housman; U.S. Pat. No. 6,338,288 to Michael J. Spadaccini; U.S. Pat. No. 8,839,915 to Anand R. Vithani; and U.S. Pat. No. 1,436,636 to Abraham Barraclough. These prior art references are representative of devices providing hand brake locking devices.

None of the above inventions and patents, taken either singly or in combination, is seen to describe the invention as claimed. Thus, a need exists for a reliable rail car hand brake locking system, and to avoid the above-mentioned problems.

SUMMARY OF THE INVENTION

It is therefore an object of the present invention to provide a locking system for a rail car hand brake, including a securing body and/or a connection member affixed to or removably attached to a housing of the hand brake, and a locking device for securing the securing body to the connection member.

In at least one (1) embodiment of the invention, the securing body has a shaft with a head end and a connection end and an extension portion extending away from a first side of the shaft. It is preferred that the securing body has a generally linear configuration. The head end removably attached to a portion of the actuation wheel of the hand brake. The connection end preferably has an aperture that enables the locking device to secure it to the connection member. The extension portion is capable of restraining upper movement of a release arm of said rail car hand brake and is generally "L"-shaped.

Another object of the present invention is to provide such a connection member having a general "L"-shape, where a first end has an aperture that, when aligned with the aperture of the connection end, enables the locking device to secure the securing body thereto.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
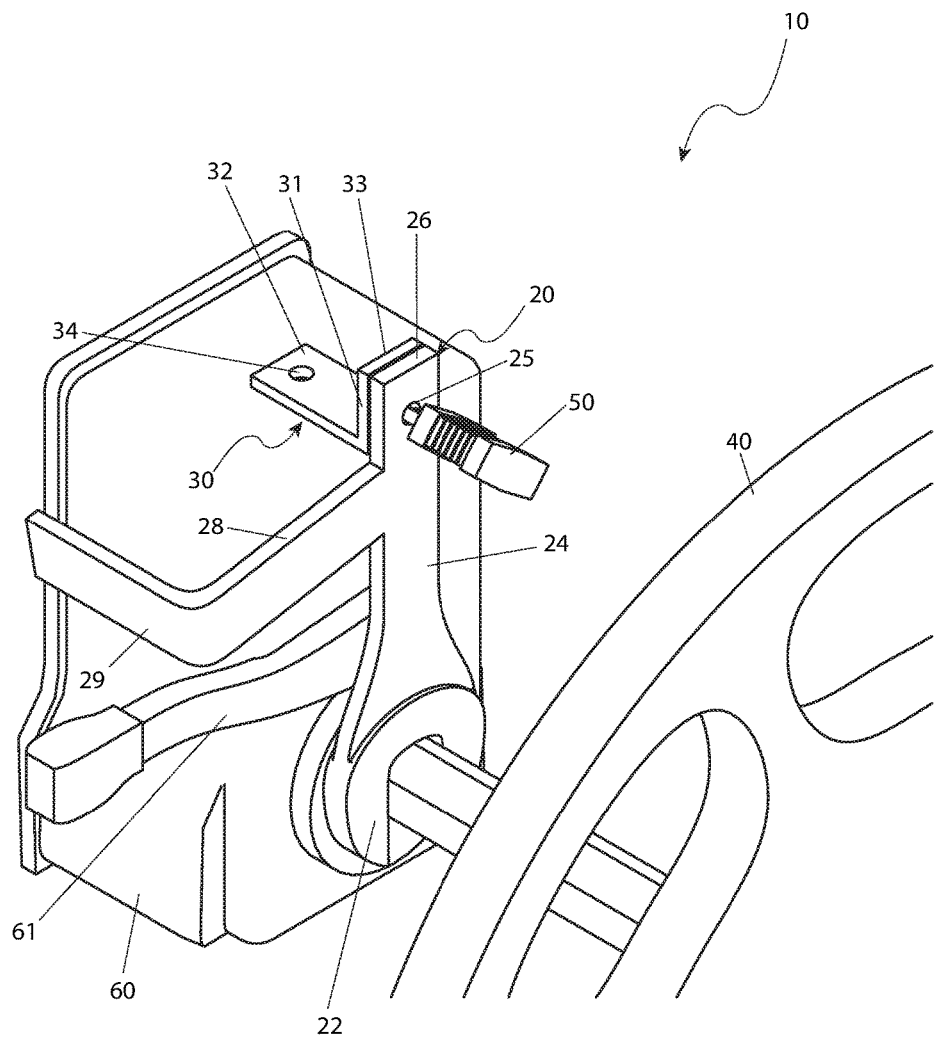
FIG. 1 is an environmental view illustrating the hand brake locking system 10 comprising a securing body 20 and a connection member 10 secured with a lock 50 on a hand brake actuation wheel 40, according to an embodiment of the present invention.
Figure 3:
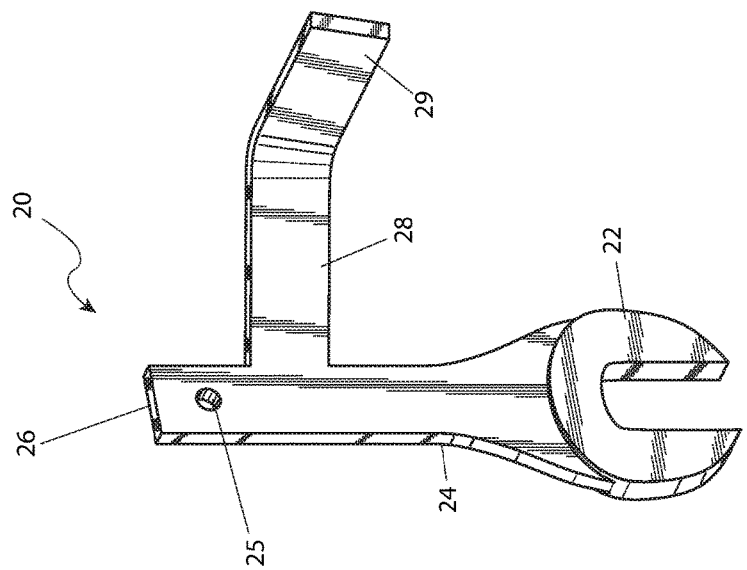
FIG. 3 is a rear perspective view of the securing body 20, according to an embodiment of the present invention.
Figure 2:
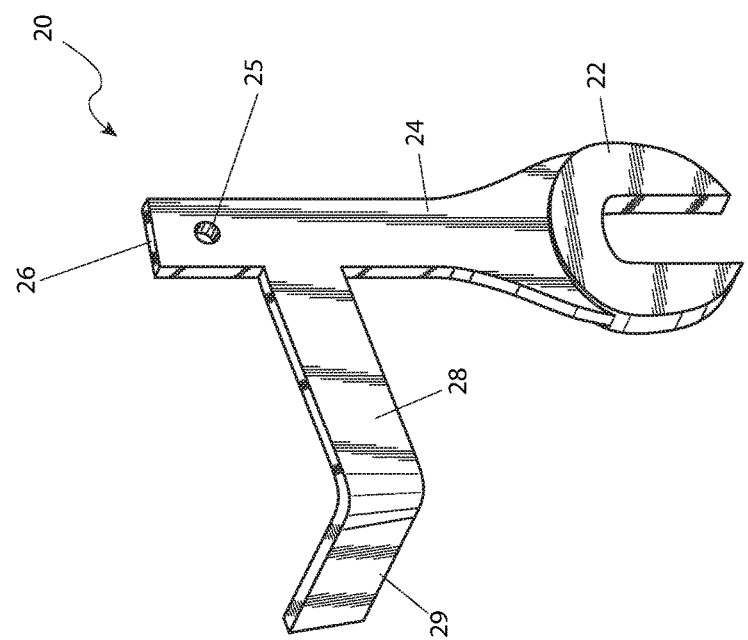
FIG. 2 is a front perspective view of the securing body 20, according to an embodiment of the present invention.
Figure 4:
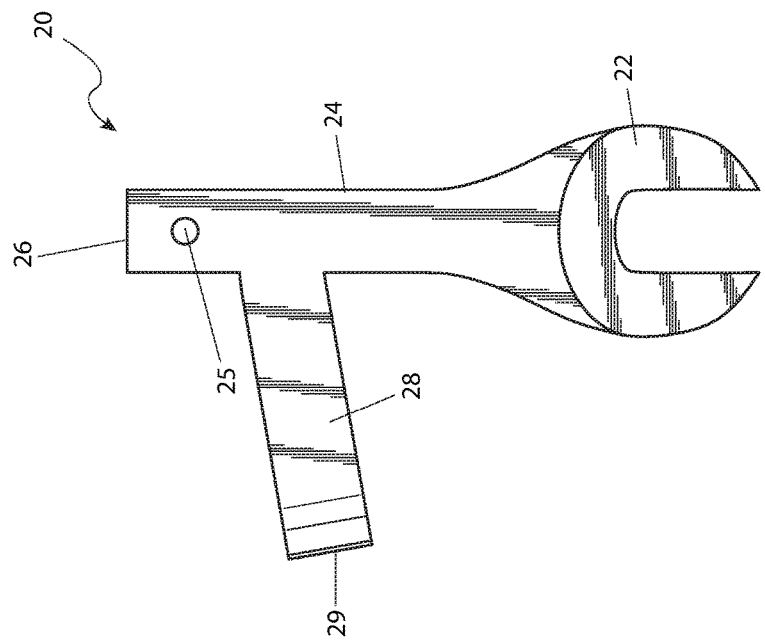
FIG. 4 is a front elevation view of the securing body 20, according to an embodiment of the present invention.
Figure 5:
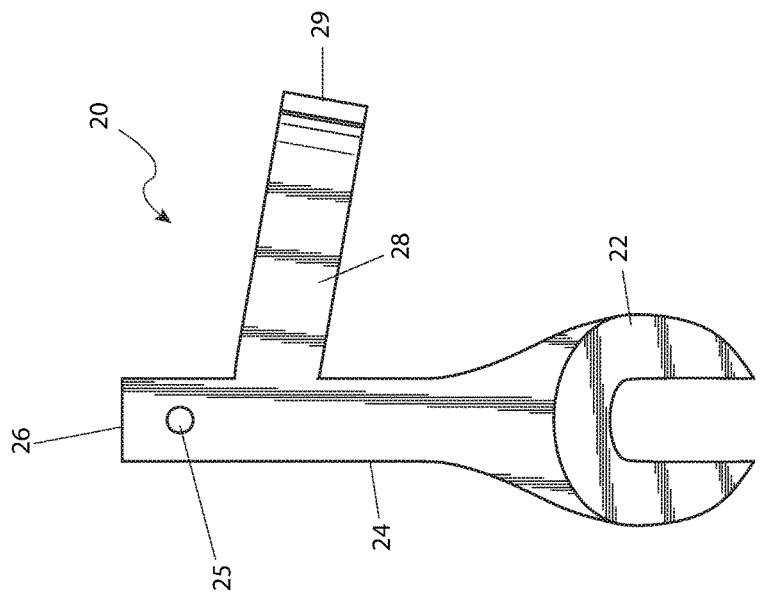
FIG. 5 is a rear elevation view of the securing body 20, according to an embodiment of the present invention.
Figure 7:
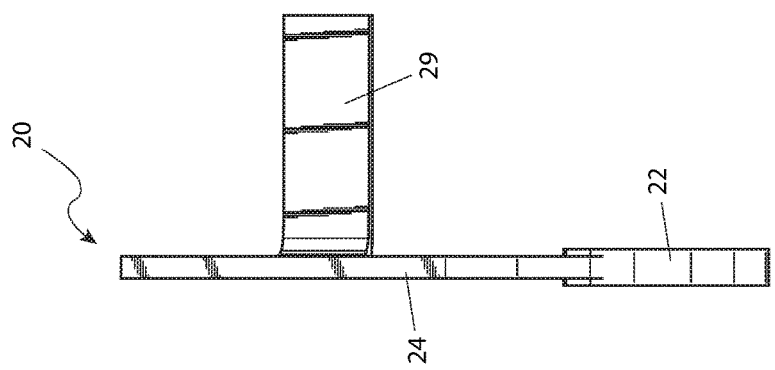
FIG. 7 is a second side elevation view of the securing body 20, according to an embodiment of the present invention.
Figure 6:
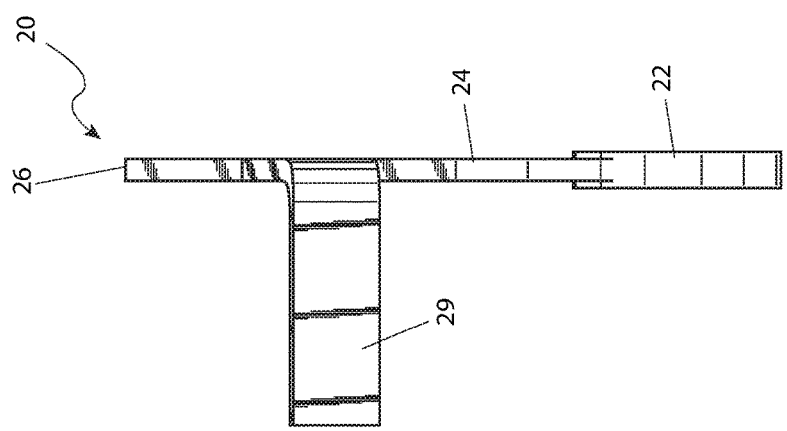
FIG. 6 is a first side elevation view of the securing body 20, according to an embodiment of the present invention.
Figure 8:
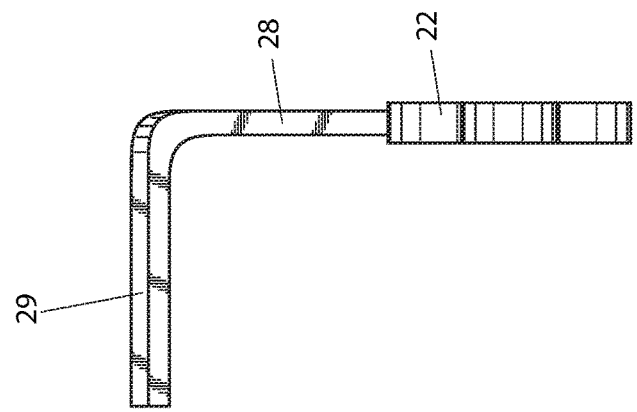
FIG. 8 is a top plan view of the securing body 20, according to an embodiment of the present invention; and, FIG. 9 is a bottom plan view of the securing body 20, according to an embodiment of the present invention.
Figure 9:
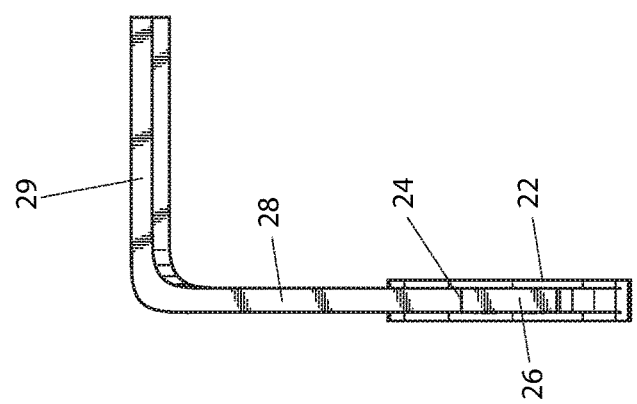

10 hand brake locking system
20 securing body
22 head end
24 securing body shaft
25 securing body aperture
26 securing body connection end
28 extension first member
29 extension second member
30 connection member
31 connection member first end
32 connection member second end
33 connection member first aperture
34 connection member second aperture
40 hand brake actuation wheel 50 lock
60 hand brake
61 release arm

DETAILED DESCRIPTION OF THE PREFERRED EMBODIMENT

The best mode for carrying out the invention is presented in terms of its preferred embodiment, herein depicted within FIGS. 1 through 9. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention is directed to a hand brake locking system (herein described as the "system") 10, particularly suited for rail cars.

Referring now to the drawings, there is shown in FIG. 1 a system 10 during an "in-use" condition, showing the securing body 20 and connection member 30 secured and locked to an actuation wheel 40 of a hand brake 60, according to an embodiment of the present invention.

A preferred embodiment of the system 10 comprises a securing body 20 and a connection member 10. The securing body 20 may comprise a head end 22, an extension portion 28, 29, and a connection end 26. The head end 22 may comprise a wrench-head extending from the securing body shaft 24. The connection end 26 is opposite the head end 22 and may be manufactured with a securing body aperture 25. The head end 22 may virtually take on a similar shape to that of a conventional one-sided open ended wrench. The purpose of the head end 22 and an extension portion 28, 29 provided by the securing body 20 may be to prevent an unauthorized user from turning the actuation wheel 40 of a rail car hand brake 60, as shown The head end 22 engages a portion of the nut on the actuation wheel 40 and cannot be slid off.

The extension portion 28, 29 may be structured and arranged such that it may extend away from a side of the securing body shaft 24. The extension portion 28, 29 may structurally embody a relatively "L"-shaped member, having an extension first member 28 extending away from a first side of the securing body shaft 24, at a minimal angle from perpendicular, and an extension second member 29 extending generally perpendicular from the extension first member 28 and rearwardly relative to the securing body shaft 24. This shape is configured as such in order to provide clearance of the extension member 28, 29 around a corner of the rail car hand brake housing 60. As shown, the extension portion 28, 29 may abut on top of a release arm 61 of a rail car hand brake 60 to add stability to the system 10 when in-use and restrain upward movement of the release arm 61. The securing body shaft 24 may act as a unitary rigid unit in order to prevent malfunction of the system 10 when properly attached to a rail car hand brake 60.

The connection member 30 may comprise a separate component structured and arranged in a relatively "L"-shaped member, comprising a connection member first end 31 and a connection member second end 32. A connection member first aperture 33 is located adjacent a distal end of the connection member first end 31 and similarly, a connection member second aperture 34 is located adjacent a distal end of the connection member second end 32. The connection member second aperture 34 may be of a design to allow a fastener, such as a bolt, to mount the connection member 30 to a top section of the rail car hand brake 60. Alternatively, the connection member 30 may be welded to a rail car hand brake 60. Other fastening means may be used.

The connection member first aperture 33 and the securing body aperture 25 may be of adequate size to allow a shackle of a lock 50 to penetrate therethrough when the connection member 30 and securing member 20 are placed adjacent to each other. The connection member 30 may be fixedly attached to a rail car hand brake 60, and may provide a secure connection between the securing body 20 and rail car hand brake 60.

In other embodiments of the system 10 the connection member 30 may not be provided, and may instead be obtained separately. The exact specifications, materials used, and method of use of the system 10 may vary upon manufacturing.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A locking system, comprising:
  a securing body, comprising:
    a shaft, having a head end and a connection end; and,
    an extension portion extending away from a first side of said shaft between said head end and said connection end comprising:
      a first member having a first end extending away from said shaft first end at a minimal angle from a perpendicular angle; and,
      a second member having a first end extending away from a second end of said first member, oriented towards a rear side of said securing body;
      wherein said extension portion is generally L-shaped;
  a connection member, having a first end and a second end; and,
  a locking device capable of removably securing said connection end to said connection member;
  wherein said head end is configured to removably attach to an actuating wheel shaft of a rail car hand brake;
  wherein said extension portion is capable of restraining upper movement of a release arm of said rail car hand brake; and,
  wherein said connection member second end is configured to be fixedly secured to a housing of said rail car hand brake.

2. The system of claim 1, wherein said securing body is generally linear.

3. The system of claim 2, wherein said head end comprises an open-ended wrench head.

4. The system of claim 1, wherein said connection end has a first aperture and said connection member first end has a second aperture that, when aligned, enables receipt of said locking device therein.

5. The system of claim 1, wherein said connection member is generally L-shaped.

6. A locking system, comprising:
    a securing body, comprising:
        a shaft, having a head end and a connection end; and,
        an extension portion extending away from a first side of said shaft between said head end and said connection end comprising:
            a first member having a first end extending away from said shaft first end at a minimal angle from a perpendicular angle; and,
            a second member having a first end extending away from a second end of said first member, oriented towards a rear side of said securing body;
            wherein said extension portion is generally L-shaped; and,
    a connection member, having a first end and a second end;
    wherein said head end is configured to removably attach to an actuating wheel shaft of a rail car hand brake;
    wherein said extension portion is capable of restraining upper movement of a release arm of said rail car hand brake;
    wherein said connection end and said connection member first end are capable of being fixedly secured to each other; and,
    wherein said connection member second end is configured to be fixedly secured to a housing of said rail car hand brake.

7. The system of claim 6, wherein said securing body is generally linear.

8. The system of claim 7, wherein said head end comprises an open-ended wrench head.

9. The system of claim 6, wherein said connection end has a first aperture and said connection member first end has a second aperture that, when aligned, is capable of receiving a locking device therein.

10. The system of claim 6, wherein said connection member is generally L-shaped.

11. A locking system, comprising:
    a shaft, having a head end and a connection end; and,
    an extension portion extending away from a first side of said shaft between said head end and said connection end comprising:
        a first member having a first end extending away from said shaft first end at a minimal angle from a perpendicular angle; and,
        a second member having a first end extending away from a second end of said first member, oriented towards a rear side of said shaft;
        wherein said extension portion is generally L-shaped; and,
    wherein said head end is configured to removably attach to an actuating wheel shaft of a rail car hand brake;
    wherein said connection end is capable of being fixedly secured to a connection member of said rail car hand brake; and,
    wherein said extension portion is capable of restraining upper movement of a release arm of said rail car hand brake.

12. The system of claim 11, wherein said shaft is generally linear.

13. The system of claim 12, wherein said head end comprises an open-ended wrench head.

14. The system of claim 11, wherein said connection end has an aperture that, when aligned with an aperture of said connection member is capable of receiving a locking device therein.

* * * * *